(12) United States Patent
Kochavi et al.

(10) Patent No.: US 11,909,850 B1
(45) Date of Patent: Feb. 20, 2024

(54) DYNAMIC IMPROVEMENT OF A COMMUNICATION CHANNEL

(71) Applicant: Amazon Technologies, Inc., Seattle, WA (US)

(72) Inventors: Gal Kochavi, Binyamina (IL); Itai Avron, Petah Tikva (IL); Benny Pollak, Yad Binyamin (IL)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/304,593

(22) Filed: Jun. 23, 2021

(51) Int. Cl.
*H04L 69/18* (2022.01)
*H04L 1/00* (2006.01)
*H04L 43/18* (2022.01)

(52) U.S. Cl.
CPC .......... *H04L 69/18* (2013.01); *H04L 1/001* (2013.01); *H04L 1/0018* (2013.01); *H04L 43/18* (2013.01); *H04L 2212/00* (2013.01)

(58) Field of Classification Search
CPC ....... H04L 69/18; H04L 1/001; H04L 1/0018; H04L 43/18; H04L 2212/00; H04L 1/0001; H04L 43/16
See application file for complete search history.

(56) References Cited

U.S. PATENT DOCUMENTS

| | | | |
|---|---|---|---|
| 7,788,365 B1 * | 8/2010 | Foster | H04L 43/00 709/224 |
| 7,974,186 B2 | 7/2011 | Yonezawa et al. | |
| 9,166,867 B2 * | 10/2015 | Gage | H04L 61/25 |
| 2002/0157054 A1 | 10/2002 | Shin et al. | |
| 2003/0058106 A1 | 3/2003 | Ikematsu | |
| 2003/0200477 A1 | 10/2003 | Ayres | |
| 2005/0034033 A1 | 2/2005 | Nemawarkar et al. | |
| 2006/0184831 A1 | 8/2006 | Lesartre et al. | |
| 2007/0208848 A1 * | 9/2007 | Bhesania | H04L 45/00 709/224 |
| 2008/0005636 A1 | 1/2008 | Conrad et al. | |
| 2008/0109707 A1 * | 5/2008 | Dell | H04L 1/0042 714/776 |

(Continued)

OTHER PUBLICATIONS

U.S. Appl. No. 17/301,254, filed Mar. 30, 2021, Kochavi et al.

(Continued)

*Primary Examiner* — Shah M Rahman
(74) *Attorney, Agent, or Firm* — Weaver Austin Villeneuve & Sampson LLP

(57) ABSTRACT

Systems and methods are provided to improve a communication channel dynamically and autonomously based on the status of the communication traffic on the communication channel between a first integrated circuit (IC) and a second IC. The communication traffic on the communication channel can be monitored, and latency, bandwidth, link quality, or power consumption associated with the communication channel for the monitored communication traffic can be determined dynamically. A modified protocol for the communication channel that can improve the communication channel as compared to an existing protocol can be determined based on the information related to the latency, bandwidth, link quality, or the power consumption. The existing protocol can be changed autonomously to the modified protocol as the communication traffic varies.

16 Claims, 11 Drawing Sheets

(56) References Cited

U.S. PATENT DOCUMENTS

| | | | |
|---|---|---|---|
| 2008/0301492 A1 | 12/2008 | Honda et al. | |
| 2009/0024883 A1* | 1/2009 | Bethard | H04L 1/22 |
| | | | 714/708 |
| 2010/0161842 A1* | 6/2010 | Shan | H04W 52/029 |
| | | | 710/110 |
| 2010/0199017 A1* | 8/2010 | Hollis | G06F 11/221 |
| | | | 710/316 |
| 2011/0296215 A1* | 12/2011 | Mobin | G06F 1/3253 |
| | | | 375/259 |
| 2012/0017121 A1 | 1/2012 | Carlson et al. | |
| 2012/0079312 A1 | 3/2012 | Muthrasanallur et al. | |
| 2012/0216084 A1* | 8/2012 | Chun | H04W 52/0209 |
| | | | 714/708 |
| 2012/0327940 A1* | 12/2012 | Long | H04L 12/4633 |
| | | | 370/392 |
| 2013/0097455 A1* | 4/2013 | Chang | G06F 11/0784 |
| | | | 714/3 |
| 2013/0179732 A1 | 7/2013 | Alanis et al. | |
| 2014/0043957 A1* | 2/2014 | Venkatraman | H04L 41/0672 |
| | | | 370/216 |
| 2014/0215491 A1* | 7/2014 | Addepalli | B60R 16/023 |
| | | | 719/313 |
| 2014/0258790 A1 | 9/2014 | Sorenson et al. | |
| 2014/0273833 A1* | 9/2014 | McCormack | H04B 5/0037 |
| | | | 455/41.1 |
| 2015/0200834 A1* | 7/2015 | Yun | H04L 43/0823 |
| | | | 370/252 |
| 2016/0373362 A1* | 12/2016 | Cheng | H04L 47/24 |
| 2017/0019186 A1* | 1/2017 | Wiley | H04L 69/08 |
| 2017/0242769 A1 | 8/2017 | Sherlock et al. | |
| 2017/0351628 A1 | 12/2017 | Li | |
| 2018/0103505 A1* | 4/2018 | Amini | H04W 84/045 |
| 2018/0183489 A1* | 6/2018 | Rasmussen | H04L 1/0071 |
| 2018/0198818 A1* | 7/2018 | Andrews | H04L 63/1458 |
| 2018/0302807 A1* | 10/2018 | Chen | H04L 45/22 |
| 2019/0104424 A1* | 4/2019 | Hariharan | H04L 1/1621 |
| 2019/0303342 A1 | 10/2019 | Jen et al. | |
| 2019/0373526 A1* | 12/2019 | Chow | H04W 36/22 |
| 2020/0059459 A1* | 2/2020 | Abraham | H04L 63/0272 |
| 2021/0126854 A1* | 4/2021 | Guo | H04L 45/24 |
| 2021/0144050 A1 | 5/2021 | Fagan | |
| 2021/0194724 A1 | 6/2021 | Lee | |
| 2022/0109747 A1 | 4/2022 | Mani et al. | |

OTHER PUBLICATIONS

U.S. Final Office Action dated Oct. 14, 2022 in U.S. Appl. No. 17/301,254.

U.S. Non-Final Office Action dated Apr. 14, 2022 in U.S. Appl. No. 17/301,254.

U.S. Notice of Allowance dated Jan. 26, 2023 in U.S. Appl. No. 17/301,254.

"IEEE Standard for Local Area Network MAC (Media Access Control) Bridges," in ANSI/IEEE Std 802.1D, 1998 Edition, Dec. 11, 1998, Sect. 6.3.9: Priority (pp. 14-15); Sect. 6.4: Internal Sublayer Service provided within the MAC Bridge (pp. 15-17); Sect. 7.5.1: Regenerating user priority (pp. 36-37); and Sect. 7.7.3: Queuing frames (pp. 39-40).

U.S. Notice of Allowance dated Jun. 20, 2023 in U.S. Appl. No. 17/301,254.

* cited by examiner

US 11,909,850 B1

DYNAMIC IMPROVEMENT OF A COMMUNICATION CHANNEL

BACKGROUND

A computing system may include multiple integrated circuits (ICs) that may communicate with each other using a communication channel based on a protocol. Generally, the communication channel is optimized for certain performance based on the design and specification of the system. However, the underlying hardware may not be optimally used for different applications supported by the computing system, which may impact performance of the computing system based on the applications being executed at different times.

BRIEF DESCRIPTION OF THE DRAWINGS

Various embodiments in accordance with the present disclosure will be described with reference to the drawings, in which.

DETAILED DESCRIPTION

Figure 1:
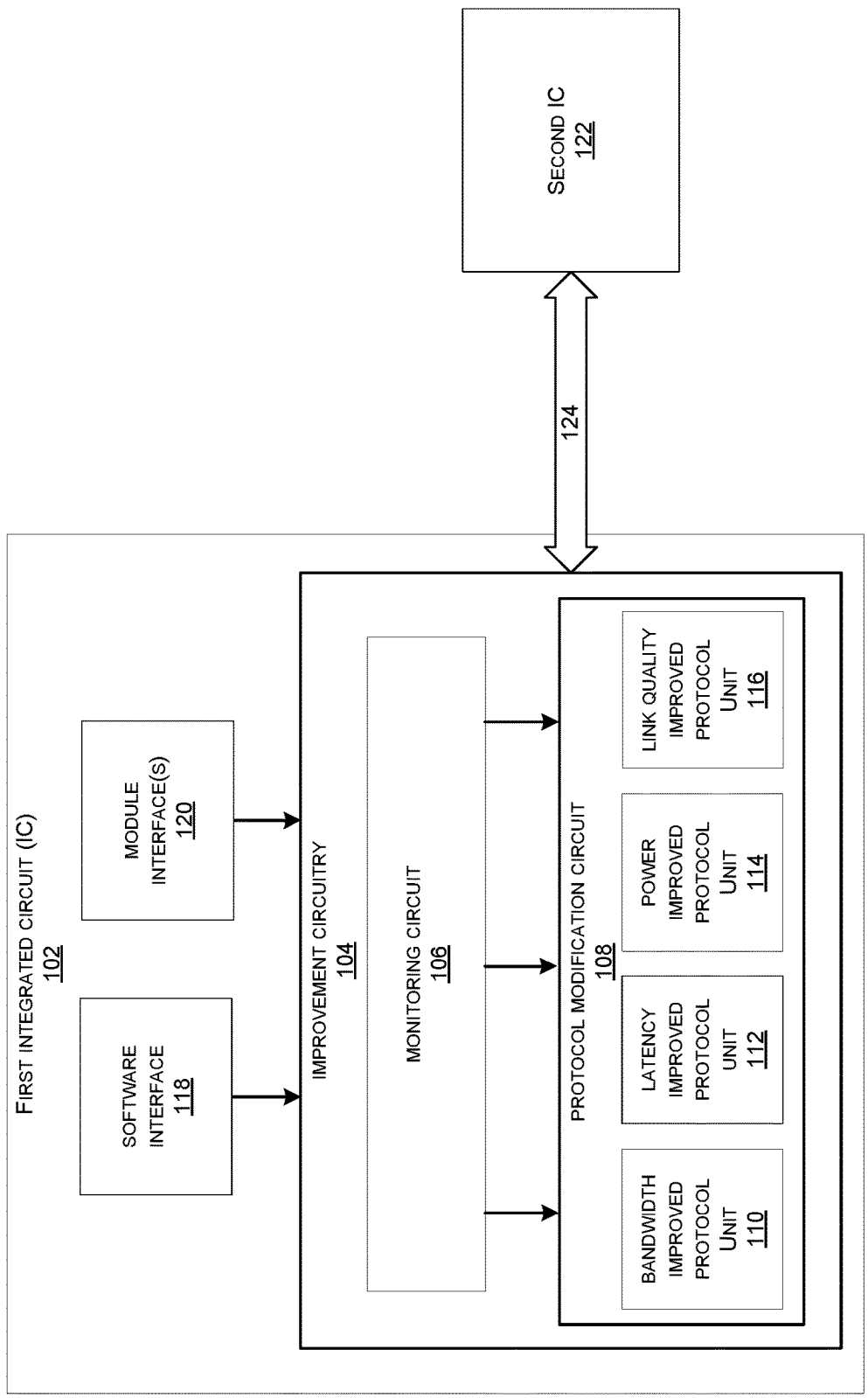
FIG. 1 illustrates an apparatus that can be used to improve a communication channel autonomously for the current communication traffic, according to certain embodiments.

A computing system may include integrated circuits (ICs) that may communicate with each other using a communication channel based on a certain protocol. The computing system may be used for various applications such as artificial intelligence (AI), Internet-of-Things (IoT), networking, web hosting, cloud computing or high-performance computing, among others. The communication may include data transfers in the form of packets for different transactions. The protocol may define the rules including the format of a packet, size of the packet, type of the packet, commands for the data transfer, or the format for acknowledgement of the data transfer. The rules are followed by both the transmitter (e.g., the transmitting IC) and the receiver (e.g., the receiving IC) of the packets for communicating over the communication channel. The protocol may also be associated with certain performance indicators including a bandwidth, latency, and/or a link quality that can be supported by the transmitter and the receiver based on the design and specification of the computing system.

Each IC may have been designed to perform certain tasks based on the system specification given the area and timing constraints. As the computing system is used for different applications, the tasks performed by the underlying hardware may change, which can cause the communication channel to operate in the sub-optimal manner at certain times. For example, the communication traffic carried by the communication channel may vary dynamically based on the usage of the computing system for a given application. The communication traffic may refer to the amount of data being transferred across the communication channel at a point in time. In most instances, changes in the communication traffic may affect the bandwidth, latency, link quality or the power consumption associated with the communication channel over time. Thus, the performance of the computing system may vary as the communication traffic on the communication channel changes based on the usage of the computing system.

In most systems, the protocol for communication over the communication channel is determined by compromising between different aspects of the required performance given the chip timing and area limitations. Certain systems may rely on measuring Quality-of-Service (QoS) to achieve the required performance by prioritizing the communication traffic based on the data transfer rate, bit error rate, transmission delay, throughput, etc. However, in most cases, software or system intervention may be required to change the protocol associated with the communication channel to meet the desired QoS for different applications.

Embodiments can provide systems and methods to autonomously change the communication protocol in hardware to improve the communication channel based on the current status of the communication channel. Improving the communication channel may include improving the performance, or reducing power consumption of the communication channel given the specification and design constraints of the computing system. The performance can be measured by minimum latency, maximum bandwidth, or minimum error rate supported by the communication channel. As an example, the communication channel may be used for communication between a first IC and a second IC. Each IC may include circuitry to improve the latency, bandwidth, power consumption, or the link quality associated with the communication channel for the current communication traffic based on a latency improved protocol, a bandwidth improved protocol, a power improved protocol, or a link quality improved protocol, respectively.

In certain embodiments, a monitoring circuit may monitor the communication traffic on the communication channel continuously to determine whether the communication channel is optimized for the current (or monitored) communication traffic. The monitoring circuit may determine that the communication channel is optimized if the latency, bandwidth, power consumption, or the link quality associated with the communication channel is optimized for the current communication traffic based on an existing protocol. If the communication channel is not optimized, the monitoring circuit may determine a modified protocol for the communication channel based on information associated with the monitored communication traffic, which can improve the communication channel in comparison to the existing protocol. The monitoring circuit may select the modified protocol from the latency improved protocol, bandwidth improved protocol, power improved protocol, or the link quality improved protocol to improve the latency, bandwidth, power consumption, or the link quality, respectively, associated with the communication channel.

The information associated with the monitored communication traffic may relate to the latency, bandwidth, link quality, or the power consumption associated with the communication channel for the monitored communication traffic. In certain embodiments, the monitoring circuit may receive the information associated with the current communication traffic from software executing on a processor, or from another component of the system, and select the modified protocol based on this information. As an example, the software may indicate that certain traffic may be low priority so that the bandwidth or the latency for this traffic can be compromised to improve the bandwidth or the latency for other traffic with higher priority. In another example, a module in the computing system may indicate that certain packet has a higher priority for transmission. The monitoring circuit may assign priorities to certain traffic or packets based on this information, which can be used to select the modified protocol.

A protocol modification circuit may be used to change the existing protocol to the modified protocol to improve the communication channel for the current communication traffic by improving the latency, bandwidth, power consumption, or the link quality using the latency improved protocol, bandwidth improved protocol, power improved protocol, or the link quality improved protocol, respectively. The monitoring circuit and the protocol modification circuit may be part of the first IC and/or the second IC. The monitoring circuit on the first IC may send a message to a corresponding monitoring circuit on the second IC regarding changing the existing protocol to the modified protocol once the modified protocol has been selected. The protocol modification circuit may use the modified protocol to improve the communication channel based on an acknowledgement from the second IC in response to the message. The second IC may also be capable to support the modified protocol used by the first IC in order to fully optimize the communication channel.

The communication channel may include multiple communication links between the ICs. In certain examples, the communication channel may include a set of serializer/deserializer (SerDes) links between two ICs or dies to transfer parallel data over serial streams. Both the ICs may include corresponding SerDes devices comprising transmitter (TX) and receiver (RX) input/outputs (IOs) for transmission and reception of the serial streams between the ICs. Each communication link may comprise two or more lanes to carry the communication traffic between the ICs. Each TX and RX IO may consume power when data is transferred over the SerDes links. The power improved protocol can be used to minimize the power consumed by the communication channel for the current traffic by determining whether one or more communication links can be powered down without impacting the required bandwidth for the data transfer. In certain embodiments, the communication traffic on multiple links can be consolidated so that fewer links are in use and other unused links can be powered down. As the communication traffic increases, the links can be powered up gradually to meet the bandwidth requirements. In some embodiments, the frequency or the voltage on the links or the IOs can be adjusted to reduce the power consumption.

The bandwidth improved protocol can be used to improve the bandwidth associated with the communication channel for the current communication traffic if the bandwidth is not optimized based on the existing protocol. As an example, the communication traffic may include transactions with different transfer sizes over multiple logical links that may be mapped to physical communication links. For example, a set of logical links may operate on a single physical communication link, or a single logical link may operate on one or more physical communication links. In certain embodiments, the data for multiple transactions can be packetized efficiently into an encapsulated packet for transmission over the communication channel. Multiple such encapsulated packets can be transmitted to improve the communication channel for the bandwidth. A receiver on the second IC can retrieve the information related to different transactions from the encapsulated packets based on the bandwidth improved protocol.

The latency improved protocol can be used to improve the latency associated with the communication channel for the current communication traffic if the latency is not optimized based on the existing protocol. In certain embodiments, instead of packetizing the data from multiple transactions into one encapsulated packet, the data for each transaction can be transmitted directly on one or more physical communication links along with a corresponding header to minimize the delay through the communication channel.

In certain embodiments, the monitoring circuit may receive the information associated with physical, electrical, or environmental parameters of the communication channel, e.g., temperature, voltage, environmental noise, etc., which can be used to determine whether the quality of a link is deteriorating based on the error rate. The monitoring circuit may select the link quality improved protocol which can initiate re-calibration of a failing link or adjust the clock or frequency used for the communication.

Thus, the embodiments can allow use of different protocols to improve the communication channel dynamically and autonomously based on the monitored communication traffic. In various embodiments, the first IC and the second IC may implement different improved protocols based on the design and specification of the system. For example, the first IC may implement the latency improved protocol to support high speed functionality, and the second IC may implement the bandwidth improved protocol to support high bandwidth functionality; however, both the first IC and the second IC can support the latency improved protocol and the bandwidth improved protocol. Both the first IC and the second IC can implement the power improved protocol and/or the link quality improved protocol. Thus, the performance, or the power consumption associated with the communication channel can be improved for different types and intensity of the communication traffic, which can improve the overall performance of the computing system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an apparatus 100 that can be used to improve a communication channel autonomously for the current communication traffic, according to certain embodiments.

The apparatus 100 may include a first integrated circuit (IC) 102 that may be configured to communicate with a second IC 122 via a communication channel 124. The communication channel 124 may include physical or logical communication links for transferring data from one or more transmitters of the data to one or more receivers of the data using a transmission medium. The transmission medium may include cables, wires, connectors, vias, printed circuit board (PCB) traces, or other type of electrical path. The data can be transferred over the transmission medium in the form of signals (e.g., analog or digital). The communication traffic may refer to the amount of data being transferred across the communication channel 124 at a given point in time. In certain examples, the data may be in the form of packets, and each packet may include a header and a payload for a corresponding transaction. The header may include information associated with the data transfer including the source, destination, transaction size, error detecting codes, or sequencing numbers.

Generally, the communication or the data transfer between the transmitter and the receiver using the communication channel 124 is based on a protocol. As discussed previously, the protocol may define the rules including, for example, the format of the packet, size of the packet, type of the packet, commands for the data transfer, and the format for the acknowledgement of the data transfer. The rules are followed by both the first IC 102 and the second IC 122 for communicating over the communication channel 124. In certain embodiments, performance of the communication channel 124 can be determined based on the bandwidth, latency, or the link quality supported by the communication channel 124. The communication channel 124 can be improved by improving the performance and/or the power consumption for the current communication traffic.

The latency can represent delay or elapsed time in transferring a packet from the transmitter to the receiver over the communication channel 124. Low latency may imply that the packet can be transferred across the communication channel 124 in a relatively short amount of time. The bandwidth can represent a maximum rate of the data transfer across the communication channel 124 or capacity of the communication channel 124. Higher bandwidth may imply that more communication traffic can be carried by the communication channel 124 within a certain time period. The power consumption may represent power consumed by different components associated with the communication channel 124, e.g., transmitters, receivers, and/or the transmission medium. The link quality may represent quality of the communication link which can be measured using a bit-error-rate (BER) or error rate. The BER can be determined based on the number of discarded packets (e.g., packets received with a checksum error) within a pre-determined time period.

The improved communication channel may correspond to certain values of the bandwidth, latency, power consumption, or the link quality, which may be based on the protocol supported by the first IC 102 and the second IC 122, and the design and specification of the system. As the communication traffic on the communication channel 124 changes based on the usage of the system for different applications, values of the bandwidth, latency, power consumption, or the link quality may change. As an example, the latency or the bandwidth of the communication channel 124 may vary based on the number of packets passing through the logical or physical links of the communication channel 124. Similarly, the power consumption of the communication channel 124 may vary based on the number of physical communications links currently carrying the traffic.

The first IC 102 may include an improvement circuitry 104 comprising a monitoring circuit 106 and a protocol modification circuit 108. The monitoring circuit 106 may be configured to continuously monitor the communication traffic on the communication channel 124. Monitoring the communication traffic may imply keeping track of the data that is entering, exiting, or currently traveling across the communication channel 124. The monitoring circuit 106 may also be configured to determine whether the latency, bandwidth, power consumption, or the link quality associated with the communication channel for the monitored communication traffic is optimized based on an existing protocol. Upon determining that the latency, bandwidth, power consumption, or the link quality is not optimized based on the existing protocol, the monitoring circuit 106 may determine a modified protocol from one or more of a latency improved protocol, a bandwidth improved protocol, a power improved protocol, or a link quality improved protocol to improve the latency, bandwidth, power consumption, or the link quality, respectively. For example, the modified protocol may be used to improve one or more of the latency, bandwidth, power consumption, or the link quality associated with the monitored communication traffic using the corresponding one or more improved protocols.

The monitoring circuit 106 may be configured to communicate with the second IC 122 via the communication channel 124 regarding change of the existing protocol to the modified protocol. For example, the monitoring circuit 106 may send a message to the second IC 122 indicating the change of the existing protocol to the modified protocol. The second IC 122 may send an acknowledgement in response to the message accepting the change. The existing protocol can be changed to the modified protocol based upon the acknowledgement from the second IC 122.

The monitoring circuit 106 may also be configured to select the modified protocol based on information received from the software executing on the first IC 102 through a software interface 118. As an example, the information from the software may indicate that certain logical or physical communication link may not be used, or certain packet may have lower priority for transmission. In another example, the software may indicate that certain mission critical traffic has high priority for transmission. The monitoring circuit 106 may also be configured to select the modified protocol based on the information received from various modules of the first IC 102 through one or more module interfaces 120. The modules may include a network controller, a direct memory access (DMA) controller, a memory controller, an input/output (I/O) controller, a neural network processor, a cryptographic engine, a graphics processing unit (GPU), or another component of the first IC 102 based on the application. As an example, the monitoring circuit 106 may receive a message from the network controller indicating that packets for a certain transaction have higher priority for transmission since the network controller may be too busy.

The monitoring circuit 106 may also be configured to select the modified protocol based on the information associated with certain physical, electrical, or environmental parameters of the communication channel 124. The physical, electrical, or environmental parameters may change over time as the dynamic operating environment of the first IC 102 changes due to the changes in the communication traffic, usage of the first IC 102, various intrinsic or extrinsic noises, among others. As an example, the monitoring circuit 106 may receive information via the module interfaces 120 from various sensors or monitors that may be configured to detect changes in the physical, electrical, or environmental parameters (e.g., temperature, voltage, environmental noise) associated with the communication channel 124, which may affect the quality of the channel.

The monitoring circuit 106 may determine the modified protocol based on the latency, bandwidth, power consumption, or link quality associated with the communication channel 124 for the monitored communication traffic, and/or the information associated with the monitored communication traffic received via the software interface 118 and the module interface(s) 120. In certain embodiments, the modified protocol may include different priorities assigned by the monitoring circuit 106 to various packets or links (physical or logical) associated with the monitored communication traffic based on the information associated with the monitored communication traffic.

In certain embodiments, the protocol modification circuit 108 may be configured to change the existing protocol to the modified protocol dynamically to improve the communication channel 124 for the monitored communication traffic as the communication traffic varies. The protocol modification circuit 108 may include a bandwidth improved protocol unit 110, a latency improved protocol unit 112, a power improved protocol unit 114, and a link quality improved protocol unit 116. The bandwidth improved protocol unit 110 may be configured to improve the bandwidth associated with the communication channel 124 for the monitored communication traffic. The latency improved protocol unit 112 may be configured to improve the latency associated with the communication channel 124 for the monitored communication traffic. The power improved protocol unit 114 may be configured to improve the power consumption associated with the communication channel 124 for the monitored communication traffic. The link quality improved protocol unit 116 may be configured to improve the link quality associated with the communication channel 124 for the monitored communication traffic.

The bandwidth improved protocol unit 110 may be configured to improve the bandwidth based on the modified protocol selected by the monitoring circuit 106. The bandwidth improved protocol unit 110 may improve the bandwidth by fully utilizing the transmission capacity of the communication channel 124 to maximize the bandwidth. In certain embodiments, the bandwidth improved protocol unit 110 may maximize the bandwidth by packetizing the data for multiple transactions into an encapsulated packet for transmission on a physical communication link. Each transaction may correspond to a logical communication link. Each logical communication link may operate on one or more physical communication links, or multiple logical communication links may operate on a single physical communication link. Thus, the data for multiple transactions can be packed into encapsulated packets for transmitting over the available physical links to fully utilize the capacity of the communication channel 124. Each encapsulated packet may include a header comprising information associated with the number of transactions in the encapsulated packet, size of each transaction, and any other relevant information.

The latency improved protocol unit 112 may be configured to improve the latency for certain packets or links based on the modified protocol selected by the monitoring circuit 106. The latency improved protocol unit 110 may improve the latency by minimizing the elapsed time for the data transfer over the communication channel 124. In certain embodiments, the latency improved protocol unit 110 may minimize the elapsed time by transmitting each packet for one or more transactions individually on the physical communication links without packetizing or encapsulating them. A header can be added to each packet indicating information associated with the transaction. In certain embodiments, one or more communication links can be designated for low latency data transfers, and the other communication links carrying the remaining traffic can be optimized for the bandwidth, power consumption, and/or the link quality.

The power improved protocol unit 114 may be configured to improve the power consumption based on the modified protocol selected by the monitoring circuit 106. The power improved protocol unit 114 may minimize the power consumed by the communication channel 124 for the current traffic by determining whether one or more communication links can be powered down without impacting the required bandwidth for the current traffic. In certain embodiments, the communication traffic on multiple links can be consolidated so that fewer links are in use and other unused links can be powered down. As the communication traffic increases, the links can be powered up gradually to meet the bandwidth requirements. In some embodiments, the frequency or the voltage on the links can be adjusted to reduce the power consumption.

The link quality improved protocol unit 116 may be configured to improve the quality of the links based on the modified protocol selected by the monitoring circuit 106. As an example, changes in physical, electrical, or environmental parameters (e.g., temperature, voltage, environmental noise) associated with each communication link in the communication channel 124 may affect the quality of the communication channel 124. In some examples, the quality of a communication link can be improved by lowering the BER. The BER or the error rate can be determined based on number of discarded packets (e.g., packets received with a checksum error) within a pre-determined time period. In some examples, the BER can be improved by resending a lost or discarded packet to the receiver, re-calibrating the link, changing the error correction code (ECC) coding, or adjusting the clock or timing of the transmitter and receiver interfaces.

In certain examples, the second IC 122 may be configured to support the modified protocol selected by the first IC 102 for communications with the first IC 102. For example, the second IC 122 may be capable to support the changes in the formatting of the packets, or configuration of the communication links associated with the latency improved protocol, bandwidth improved protocol, power improved protocol, or the link quality improved protocol. The first IC 102 and the second IC 122 may be part of a system-on-chip (SoC), a larger IC, or two different devices. In certain embodiments, the second IC 122 may include another improvement circuitry comprising a corresponding monitoring circuit and a protocol modification circuit. This is further described with reference to FIG. 2.

Figure 2:
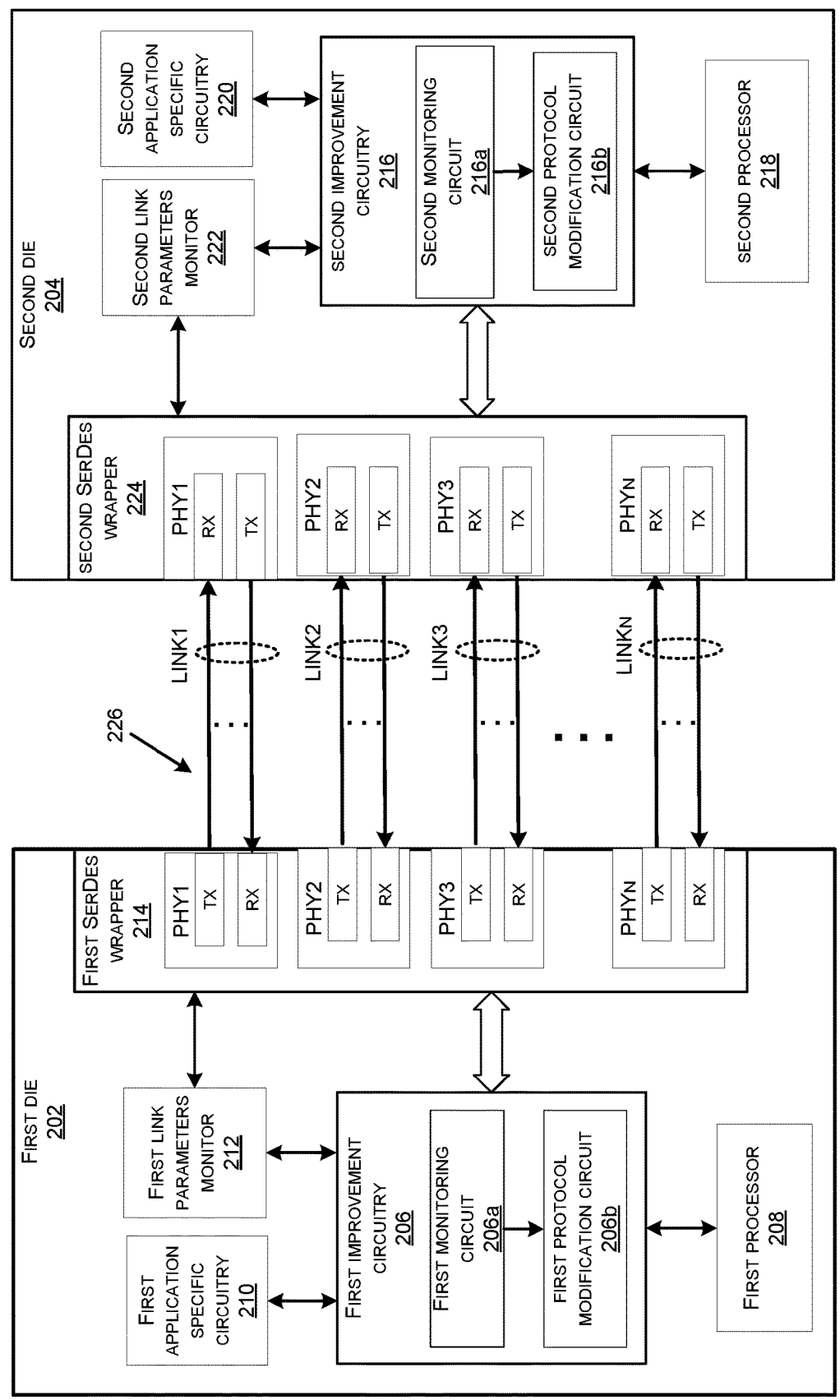
FIG. 2 illustrates an apparatus that can be used to improve a communication channel between two dies, according to certain embodiments.

FIG. 2 illustrates an apparatus 200 that can be used to improve a communication channel between two dies, according to certain embodiments. The two dies may be configured to communicate using a die-to-die (d2d) interface, e.g., Serializer/De-serializer (SerDes).

The apparatus 200 may include a first die 102 configured to communicate with a second die 204 via a communication channel 226. The communication channel 226 may be an example of the communication channel 124 in FIG. 1. The communication channel 226 may include N SerDes links comprising LINK1, LINK2, LINK3, . . . , and LINKn. The N SerDes links can be configured to support any serial interface including PCI express, SATA, XAUI, or SAS. In certain embodiments, the first die 202 and the second die 204 may be part of a system-on-chip (SoC) that can be used for different applications including artificial intelligence (AI), Internet-of-Things (IoT), networking, web hosting, cloud computing, or high-performance computing, among others.

The first die 202 may include a first improvement circuitry 206 and the second die 204 may include a second improvement circuitry 216. The first improvement circuitry 206 or the second improvement circuitry 216 may be an example of the improvement circuitry 104 in FIG. 1. The first improvement circuitry 206 may include a first monitoring circuit 206a and a first protocol modification circuit 206b. The second improvement circuitry 216 may include a second monitoring circuit 216a and a second protocol modification circuit 216b. The first improvement circuitry 206 may be configured to communicate with a first processor 208, a first application specific circuitry 210, and a first link parameters monitor 212. Similarly, the second improvement circuitry 216 may be configured to communicate with a second processor 218, a second application specific circuitry 220, and a second link parameters monitor 222.

The first die 202 may also include a first SerDes wrapper 214 comprising N physical (PHY) units, and the second die 204 may also include a second SerDes wrapper 224 comprising corresponding N PHY units. Each set of the N PHY units may include a PHY1, PHY2, PHY3, . . . , and a PHYn to provide high speed interface for communication between the first die 202 and the second die 204 using corresponding communication links from LINK1-LINKn. For example, LINK1 may be coupled to the corresponding PHY1, LINK2 may be coupled to the corresponding PHY2, LINK3 may be coupled to the corresponding PHY3, and LINKn may be coupled to the corresponding PHYn on each of the first die 202 and the second die 204. Each of the N physical communication links can be mapped to one or more logical communication links.

Each PHY unit may include one or more transmitters (TX) and one or more receivers (RX) to communicate with corresponding one or more receivers (RX) and one or more transmitters (TX) on the other die using one or more lanes for a respective communication link. As an example, the number of lanes can be 4, 8, 16, or more based on the implementation. The communication channel 226 may include connectors, vias, printed circuit board (PCB) traces, or wires to provide an electrical path between each transmitter and receiver. Note that FIG. 2 illustrates an example implementation of the SerDes PHY; however, scope of the disclosure is not limited to a specific implementation of the SerDes PHY or the d2d interface.

Each transmitter TX may include a serializer circuit to convert parallel data into serial data, and an input/output (I/O) interface to transmit the serialized data to a respective receiver RX on another die on a respective lane. Each receiver RX may include an I/O interface to receive the serialized data on the respective lane from a respective transmitter TX on the other die, and a de-serializer circuit to convert the serial data into parallel data. Note that the transmitters and the receivers may also include additional circuits like buffers, latches, FIFOs, multiplexers, de-multiplexers, or connectors based on the implementation.

Each of the first SerDes wrapper 214 and the second SerDes wrapper 224 may also include circuitry to support the functionality of each PHY unit, e.g., physical coding sublayer (PCS) units, and clock circuits, which are not shown in FIG. 2 for ease of illustration. The clock circuits may be used to provide clocking for the respective TX and RX interfaces. The clock circuits may include a phase-locked loop (PLL) circuit, reference clock buffers, and any other circuitry. As an example, the PLL circuit may generate a transmit clock that can be used to latch the data into the serializer and can be embedded into the serial stream for transmission via the TX transmitter. The clock circuits may also generate a data recovery clock which can be used to recover the embedded clock received from the transmitting die via the receiver RX. In certain implementations, the clock circuits may utilize a reference clock to generate the TX and RX clocks.

The PCS may be used for translating data to and from the parallel interface, perform data encoding/decoding, symbol alignment, or other suitable tasks. As an example, the PCS may perform encoding (e.g., 8b/10b encoding) on the parallel data using a high-speed clock generated by the clock circuits. The encoded data can be fed to the serializer of a TX lane for transmitting the serialized data to the second die 204. The PCS may also be used to perform decoding (e.g., 8b/10b decoding) on the parallel data received from the de-serializer of an RX lane using a data recovery clock generated by the clock circuits to generate the decoded data.

In certain implementations, each of the first SerDes wrapper 214 and the second SerDes wrapper 224 may also include circuitry to provide control signals to the on-chip N PHY units or receive status signals from the N PHY units. For example, the control and status signals may include information associated with the links, e.g., link configuration, link reset, link calibration, link status, etc.

In certain examples, each lane between a TX and a corresponding RX may include two wires to support differential signaling for technologies like LVDS. Generally, two or more lanes between a PHY unit on the first die 202 and a corresponding PHY unit on the second die 204 can be mapped to a single communication link. For example, a first communication link (e.g., LINK1) may include the lanes between the PHY1 unit on the first die 202 and the PHY1 unit on the second die 204, and a second communication link (e.g., LINK2) may include the lanes between the PHY2 unit on the first die 202 and the PHY2 unit on the second die 204. The lanes for each PHY unit may include digital and analog circuits.

A PHY unit on one of the dies may transmit a packet for a transaction on one of the links using a transmitter TX. A corresponding receiver RX on the other die may receive the packet via the link. Generally, a plurality of packets may be transmitted in both directions by the respective transmitters and received by the corresponding receivers. The latency for each packet may be calculated based on the time it would take a packet to travel from a transmitter TX to a receiver RX via the link. If there are multiple packets being transmitted on the same link, it may take longer to reach the receiver and therefore the latency will be higher. As an example, a packet may be transmitted by the transmitter of the PHY1 on the first die 202 via LINK1 and received by the corresponding receiver of the PHY1 on the second die 204. In some instances, a set of logical links may operate on LINK1 for transferring multiple packets associated with different transactions. This may increase the latency for each packet travelling via LINK1.

Generally, the normal operation of the PHY units may include an error detection and recovery process. For example, an error detection and correction technique such as checksum, forward error correction (FEC) or cyclic redundancy check (CRC) can be built-in to the SerDes devices to minimize the BER for each link. For example, the BER (or simply the error rate) can be calculated based on the number of bits received incorrectly as compared to the number of bits transmitted. In the normal operation, when an error is detected in a packet received by a receiver that was transmitted by a transmitter over a communication link, a request can be sent to the transmitter to resend the packet.

The first processor 208 may be configured to execute a computer program in the form of instructions that may be stored in a computer-readable medium (not shown). The instructions, when executed, can cause the first processor 208 to perform certain functionality based on the application. An operating system executing on the first processor 208 may assign resources and manage scheduling of various processes associated with the application in a virtualized environment. In certain instances, the operating system or a process may send a message to the first monitoring circuit 206a with information associated with one or more communication links or packets. For example, the information may indicate that certain logical link may not be used or may have lower priority for transmission. Thus, the monitoring circuit 206a may assign lower bandwidth or higher latency for that logical link so that the other logical links can be assigned higher bandwidth or lower latency to fully optimize the communication channel 226.

In certain examples, one or more logical communication links may operate on one or more physical communication links from the N links. As an example, the logical communication links may be associated with the processes or applications executing on the first processor 208. In certain embodiments, mapping of a logical link to a physical link may be based on the communication protocol used by the communication channel 226 for different applications. The protocol may further define different values for the bandwidth, latency, power consumption, and the link quality supported by the communication channel 226 based on the mapping. However, as the communication traffic varies over the communication channel 226 for different applications, the communication channel 226 may not be fully optimized since the values of the bandwidth, latency, power consumption, or the link quality may change with the traffic.

The first link parameters monitor 212 may be configured to monitor various physical, electrical, or environmental parameters (e.g., temperature, voltage, environmental noise) associated with the communication channel 226 that can affect the performance of the communication channel 226. For example, the first link parameters monitor 212 may include sensors for temperature, voltage, process, or other parameters related to the operating environment of the communication channel 226. In some examples, change in the temperature or the voltage associated with the PHY units can increase the power dissipation of the circuits, or impact the functionality of the analog circuits in the SerDes interface. In some examples, various intrinsic or extrinsic noises (e.g., faulty components, electrostatic discharges, thermal noise, electrical interference) can increase the error rate, and thus lower the quality of the SerDes links. The first link parameters monitor 212 may send a message to the monitoring circuit 106 upon detecting that the quality of a link is going down so that the monitoring circuit 106 can select the link quality improved protocol as the modified protocol to improve the quality of the links and improve the performance of the communication channel 226. As an example, the first link parameters monitor 212 may determine that the quality of the link has decreased by comparing the BER with an appropriate threshold value. In certain embodiments, some of the components or functionality of the first link parameters monitor 212 may be part of the first SerDes wrapper 214, e.g., sensors.

The first application specific circuitry 210 may include one or more modules of the first die 202 with different functionalities based on the applications. For example, the modules may include a network controller, a DMA controller, a memory controller, an I/O controller, a GPU, a neural network processor, a cryptographic engine, or other modules based on the application of the first die 202. As an example, in some instances, the network controller may be too busy to send certain high priority packets within a desired time period. In such cases, the network controller may send a request to the first monitoring circuit 206a to transmit those packets with minimum latency. The first monitoring circuit 206a can select the latency improved protocol unit 112 to provide the modified protocol to minimize the latency for transmission of those packets.

The second monitoring circuit 216a may also be configured to determine the modified protocol based on the latency, bandwidth, power consumption, or the link quality associated with the communication channel 226 for the monitored communication traffic, and the information associated with the monitored communication traffic received from the second processor 218, and the second application specific circuitry 220. The second monitoring circuit 216a may also receive information from the second link parameters monitor 222 related to various physical, electrical, or environmental parameters (e.g., temperature, voltage, environmental noise) associated with the communication channel 226 that can affect the performance of the communication channel 226. Based on the information, the second monitoring circuit 216a may select the link quality improved protocol as the modified protocol to improve the quality of the links and improve the performance of the communication channel 226.

In some embodiments, the first die 202 may have low latency requirements and the second die 204 may have high bandwidth requirements based on the functionalities supported by the first 202 and the second die 204. In such cases, the first monitoring circuit 206a may be configured to determine the modified protocol based on minimizing the latency through the communication channel 226, and the second monitoring circuit 216a may be configured to determine the modified protocol based on maximizing the bandwidth through the communication channel 226. In some cases, there may be a conflict in selecting the modified protocol which has been accepted by both the monitoring circuits 206a and 206b. In such cases, a default protocol may be used.

Figure 3:
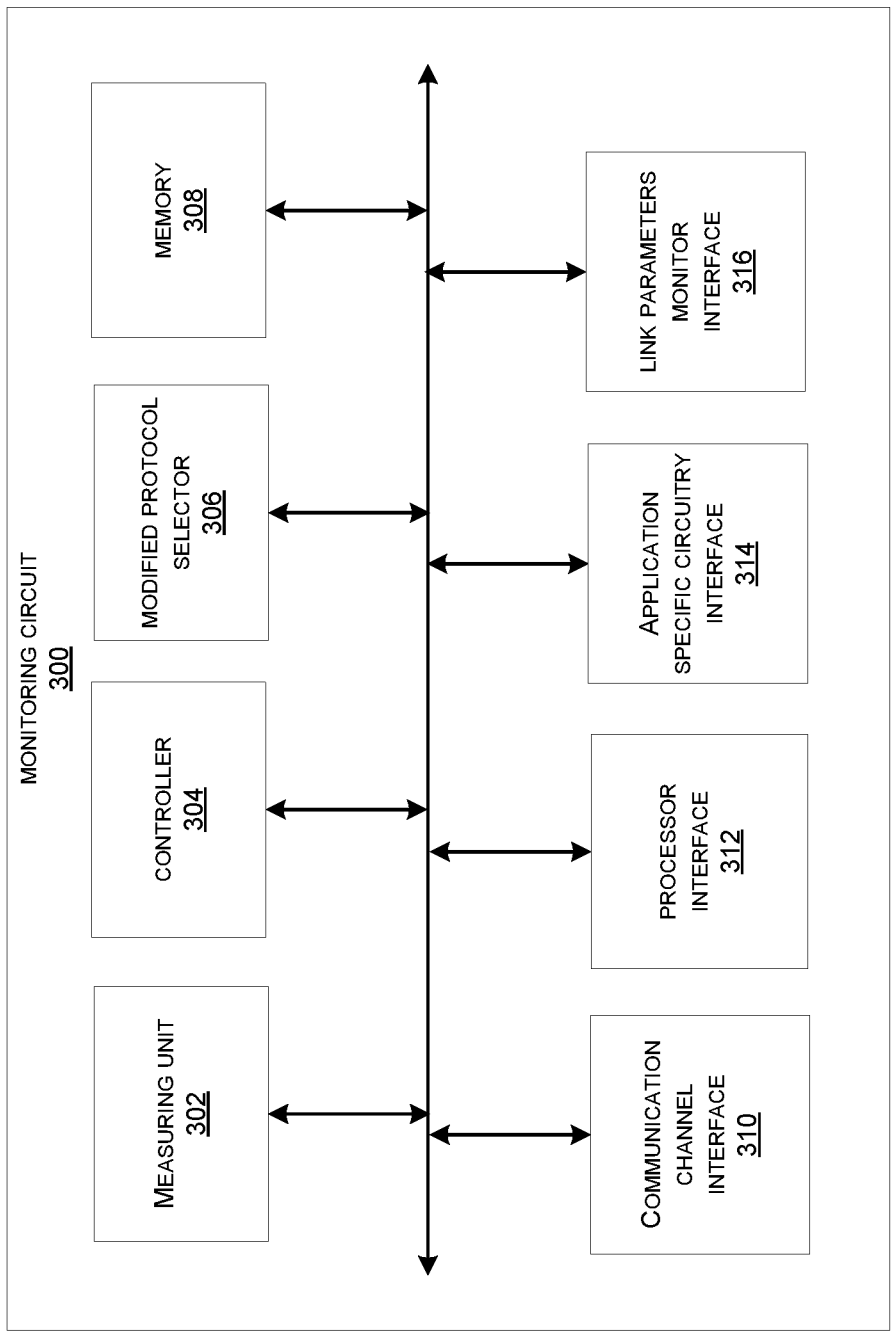
FIG. 3 illustrates a monitoring circuit that can be used to monitor communication traffic on a communication channel between two integrated circuits, according to certain embodiments.

FIG. 3 illustrates a monitoring circuit 300 that can be used to monitor communication traffic on a communication channel between two integrated circuits, according to certain embodiments. As an example, the communication channel may be the communication channel 226 in FIG. 2.

The monitoring circuit 300 can be an example implementation of the monitoring circuit 106, first monitoring circuit 206a, or the second monitoring circuit 216a. The monitoring circuit 300 may include a measuring unit 302, a controller 304, a modified protocol selector 306, memory 308, a communication channel interface 310, a processor interface 312, an application specific circuitry interface 314, and a link parameters monitor interface 316. Note that FIG. 3 is described with reference to the first monitoring circuit 206a. However, it will be understood that the functionality of the second monitoring circuit 216a may be same as the first monitoring circuit 206a in certain examples. The memory 308 may be implemented using any suitable memory type including registers, buffers, latches, dynamic random access memory (DRAM), or a static RAM (SRAM). The memory 308 may be used to store the threshold values, configuration values, state machine variables, and any other relevant information. The memory 308 may also be used to store different threshold values for the latency, bandwidth, power consumption, and the link quality associated with the improved communication channel.

The measuring unit 302 may be used to monitor the communication traffic on the communication channel 226 using a communication channel interface 310. For example, the measuring unit 302 may monitor each PHY unit on the first die 202 by communicating with the first SerDes wrapper 214 via the communication channel interface 310. The measuring unit 302 may determine the latency, bandwidth, power consumption, and the link quality continuously for different packets or links associated with the monitored traffic by communicating with each PHY unit.

The controller 304 may be used to manage and provide controls for different components of the monitoring circuit 300. The controller 304 may be implemented using state machines, decoders, or other suitable circuits. The controller 304 may dynamically compare the latency, bandwidth, power consumption, and the link quality for each packet calculated by the measuring unit 302 with respective threshold values to determine whether the communication channel 226 has been fully optimized for the monitored communication traffic based on the existing protocol. Based on the comparison, the controller 304 may signal the modified protocol selector 306 to select a modified protocol accordingly.

The controller 304 may also signal the modified protocol selector 306 to select the modified protocol based on the inputs from the first processor 208, the first application specific circuitry 210, and the first link parameters monitor 212. The controller 304 may receive a message from the first processor 208 via a processor interface 312 including information associated with the status of one or more packets or links. The controller 304 may also receive a message from one or more modules in the first application specific circuitry 210 via a corresponding application specific circuitry interface 314 including information associated with the status of one or more packets or links. The controller 304 may also receive a message from the first link parameters monitor 212 via a link parameters monitor interface 316 including information associated with the status of one or more packets or links.

Based on the information received from the measuring unit 304 related to the latency, bandwidth, power consumption, and the link quality of the packets, and the information associated with the status of one or more packets or the links received from the first processor 208, first application specific circuitry 210, and the first link parameters monitor 212, the controller 304 may generate control signals that can be used to determine the modified protocol. In certain examples, the control signals may include different priorities assigned to different links or packets for optimizing the communication channel 226 efficiently.

The modified protocol selector 306 may be used to determine the modified protocol based on the latency improved protocol, bandwidth improved protocol, power improved protocol, or the link quality improved protocol using the control signals from the controller 304. In certain embodiments, the modified protocol selector 306 may be used to select different modified protocols for different communication links. For example, if LINK1 is reserved for low latency data transfers, the modified protocol selector 306 may assign the packets that need to be improved for latency to be directed to LINK1. In this case, remaining links (e.g., LINK2-LINKn) may be improved for bandwidth and/or power consumption. For example, packets from LINK2-LINKn can be packetized so that LINKn can be disabled to reduce power consumption and the packetized data can be transmitted on LINK2-LINKn−1 to increase the bandwidth.

Figure 4:
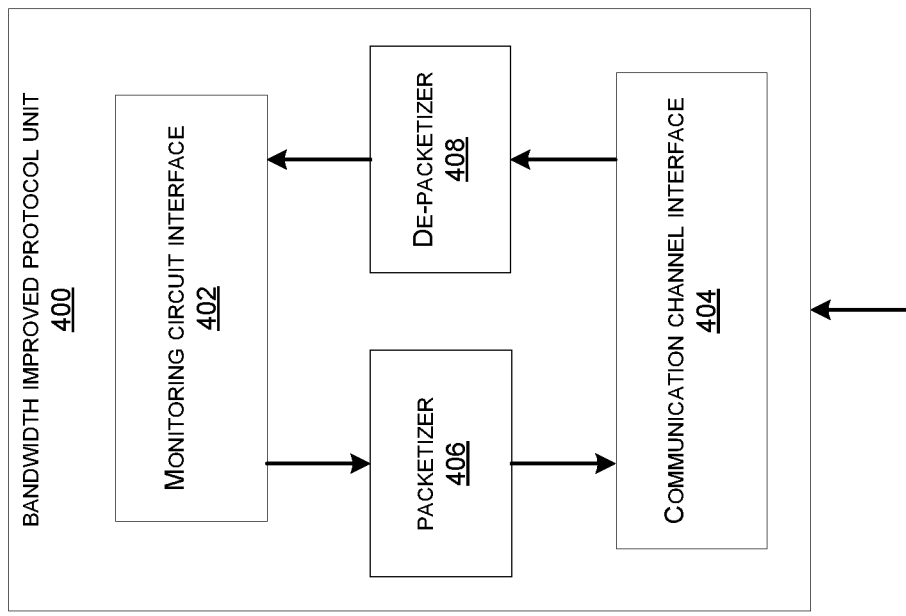
FIG. 4 illustrates a high level block diagram of a bandwidth improved protocol unit that can be used to improve the bandwidth associated with a communication channel, according to certain embodiments.

FIG. 4 illustrates a high level block diagram of a bandwidth improved protocol unit 400 that can be used to improve the bandwidth associated with a communication channel, according to certain embodiments. The bandwidth improved protocol unit 400 can be an example implementation of the bandwidth improved protocol unit 110.

In certain embodiments, the bandwidth improved protocol unit 400 can be part of the first protocol modification circuit 206b and/or the second protocol modification circuit 216b. As an example, the bandwidth improved protocol unit 400 may be used by the first protocol modification circuit 206b and the second protocol modification circuit 216b to improve the bandwidth of the communication channel 226. The example bandwidth improved protocol unit 400 may include a monitoring circuit interface 402, a packetizer 406, a de-packetizer 408, and a communication channel interface 404.

The monitoring circuit interface 402 may be used for communication with the monitoring circuit 106. As an example, the monitoring circuit interface 402 may be used to receive the modified protocol select signal from the monitoring circuit 106, which can be used to select the bandwidth improved protocol for transmission of one or more packets over the communication channel 226 using the communication channel interface 404.

The packetizer 406 may be used for packetizing payload data from multiple packets into a single encapsulated packet such that multiple such encapsulated packets can be transmitted sequentially to fully utilize the capacity of the communication channel 226. For example, a set of packets corresponding to different transactions can be encapsulated and the encapsulated packet can be transmitted over the communication channel 226 instead of transmitting the individual packets. An example encapsulated packet is shown in FIG. 5.

Figure 5:
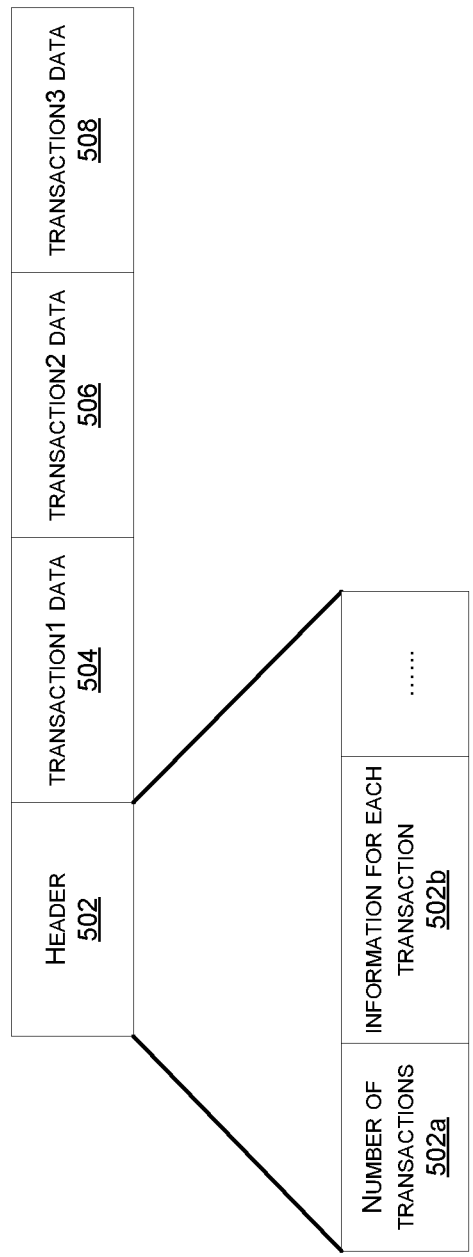
FIG. 5 illustrates an example encapsulated packet that can be used to improve the bandwidth of a communication channel according to certain embodiments.

FIG. 5 illustrates an example encapsulated packet 500 that can be used to improve the bandwidth of a communication channel, according to certain embodiments.

The encapsulated packet 500 may include a header 502, transaction) data 504, transaction2 data 506, and transaction3 data 508. In some examples, the transaction) data 504 may include payload data that was directed for transmission on a logical link1, the transaction2 data 506 may include payload data that was directed for transmission on a logical link2, and the transaction3 data 508 may include payload data that was directed for transmission on a logical link3. Referring back to FIG. 2, in some examples, the logical link1 may be mapped to LINK1, the logical link2 may be mapped to LINK2, and the logical link3 may be mapped to LINK3. In some other examples, the transaction) data 504, transaction2 data 506, and the transaction3 data 508 may correspond to a single logical link that may be operating on LINK1, LINK2, and LINK3.

The header 502 may include number of transactions 502a, information for each transaction 502b, and any other relevant information. The number of transactions 502a may indicate the number of transactions that have been grouped into the encapsulated packet 500. The information for each transaction 502b may include information associated with the source, destination, transfer size, ECC bits, and any other relevant information. In certain examples, the source and destination for each transaction may be the same, and the header 502 may include sequencing information for reassembling the data (e.g., the data for each transaction may belong to the same dataset). In some examples, the header 502 may also include information related to the protocol used for transmission of the encapsulated packet 500.

Referring back to FIG. 4, the packetizer 406 may be used to packetize data corresponding to various transactions into the encapsulated packet 500. Multiple such encapsulated packets can be assembled by the packetizer 406 to fully utilize the capacity of the communication channel 226. Note that the number of packets that can be encapsulated may depend upon the design and specification of the system, and the type of the communication traffic, among others. The encapsulated packet 500 can be transmitted by the transmitter TX of the PHY unit on the first die 202.

The communication channel interface 404 can be used to communicate with the corresponding SerDes wrapper for transmission of one or more encapsulated packets 500. For example, the one or more encapsulated packets 500 can be sent to the PHY1-PHYn units, which can transmit the packetized data over LINK1-LINKn using the corresponding TX transmitters.

The communication channel interface 404 can also be used by the receiving IC to receive the encapsulated packets 500 using the corresponding RX receivers. For example, the encapsulated packets 500 may be received by the bandwidth improved protocol unit 400 in the second protocol modification circuit 216b using the corresponding communication channel interface 404.

The de-packetizer 408 may be used to disassemble the encapsulated packet 500 received over the communication channel 226. The de-packetizer 408 may parse the encapsulated packet 500 to retrieve the transaction) data 504, transaction2 data 506, and the transaction3 data 508 corresponding to the one or more logical links. The transaction) data 504, transaction2 data 506, and the transaction3 data 508 can be sent to the monitoring circuit 106 via the monitoring circuit interface 402. The monitoring circuit 106 can forward the disassembled data to the appropriate modules in the second die 204 for the intended usage.

Figure 6:
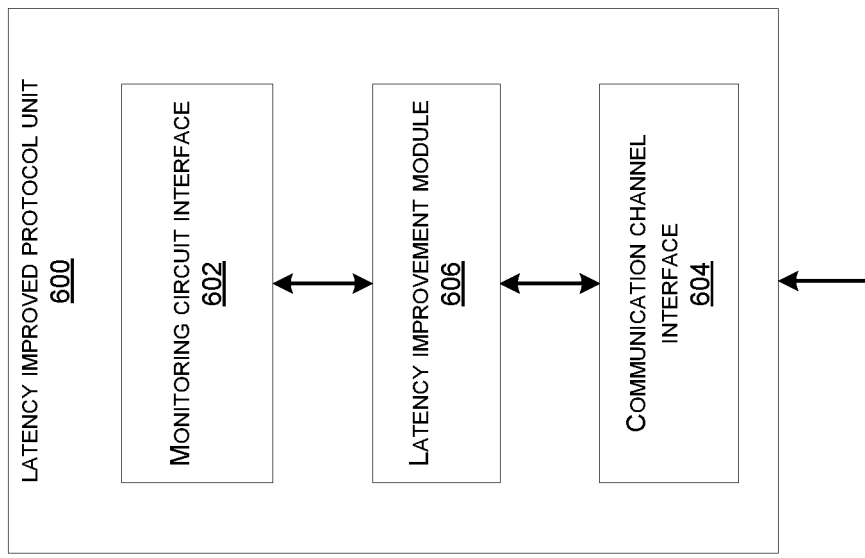
FIG. 6 illustrates a high level block diagram of a latency improved protocol unit that can be used to improve the latency associated with a communication channel, according to certain embodiments.

FIG. 6 illustrates a high level block diagram of a latency improved protocol unit 600 that can be used to improve the latency associated with a communication channel, according to certain embodiments. The latency improved protocol unit 600 can be an example implementation of the latency improved protocol unit 112.

In certain embodiments, the latency improved protocol unit 600 can be part of the first protocol modification circuit 206b and/or the second protocol modification circuit 216b. As an example, the latency improved protocol unit 600 may be used by the first protocol modification circuit 206b or the second protocol modification circuit 216b to improve the latency of the communication channel 226. The example latency improved protocol unit 600 may include a monitoring circuit interface 602, a latency improvement module 606, and a communication channel interface 604.

The monitoring circuit interface 602 may be used for communication with the monitoring circuit 106. As an example, the monitoring circuit interface 602 may be used to receive the modified protocol select signal from the monitoring circuit 106, which can be used to select the latency improved protocol for transmission of one or more packets over the communication channel 226.

The latency improvement module 606 may be used to improve (e.g., reduce) the latency in transmission of one or more packets over the communication channel 226. In certain embodiments, the latency improvement module 606 may improve the latency by transmitting individual packets on the link that may be associated with one or more transactions. As discussed with reference to FIGS. 4 and 5, packetizing the payload data belonging to multiple transactions into a single packet can increase the bandwidth; however, the latency to transmit the packetized data across the communication channel 226 may increase. Thus, the latency improvement module 606 may improve the latency by passing the packets associated with the one or more transactions individually. The example packets are shown in FIG. 7.

Figure 7:
FIG. 7 illustrates example packets that can be used to improve the latency of a communication channel according to certain embodiments.

FIG. 7 illustrates example packets 700 that can be used to improve the latency of a communication channel according to certain embodiments.

A first packet 702 may include a header1 702a, and a transaction1 data 702b. A second packet 704 may include a header2 704a, and a transaction2 data 704b. A third packet 706 may include a header3 706a, and a transaction3 data 706b. Each header 702a-706a may include corresponding information associated with the source, destination, transfer size, CRC bits, or sequencing. The transaction1 data 702b, transaction2 data 704b, and the transaction3 data 706b may include corresponding payload data for each packet. In some examples, the transaction1 data 702b, transaction2 data 704b, and the transaction3 data 706b may be part of a single transaction that may be split for transmission on three links individually to minimize the latency.

In certain examples, the first packet 702, second packet 704, and the third packet 706 may be assigned to a logical link), which may be operating on LINK1. Referring back to FIG. 6, the latency improvement module 606 may minimize the latency by assigning the first packet 702 for transmission on LINK1, the second packet 704 for transmission on LINK2, and the third packet 706 for transmission on LINK3.

Referring back to FIG. 6, the communication channel interface 604 can be used to communicate with the SerDes wrapper for transmission of the individual packets 702-706. For example, the individual packets 702-706 can be transmitted to the PHY1-PHYn units, which can transmit each packet over respective links from the LINK1-LINKn using the corresponding TX transmitters.

The communication channel interface 604 can also be used by the receiving IC to receive the individual packets 702-706 using the corresponding RX receivers. For example, the individual packets 702-706 may be received by the latency improved protocol unit 600 in the second improvement circuitry 216 using the corresponding communication channel interface 604.

In certain embodiments, one or more links in the N links can be designated as low latency links. For example, the modified protocol select signal from the monitoring circuit 106 may also include information about the designated links that can be used for transmitting the packets for low latency data transfer. The latency improvement module 606 may assign the designated links for transmitting the packets and send the packets to the PHY units corresponding to those links via the communication channel interface 604 for transmission.

Figure 8:
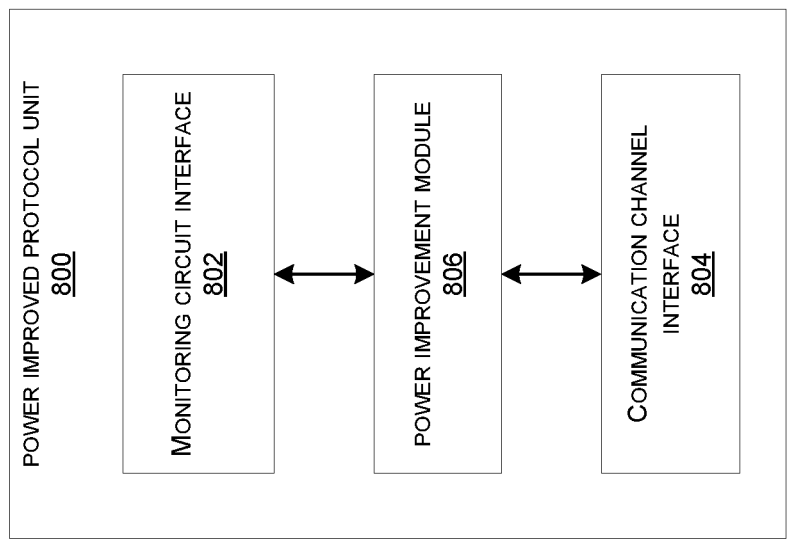
FIG. 8 illustrates a high level block diagram of a power improved protocol unit that can be used to improve the power consumption associated with a communication channel, according to certain embodiments.

FIG. 8 illustrates a high level block diagram of a power improved protocol unit 800 that can be used to improve the power associated with a communication channel, according to certain embodiments. The power improved protocol unit 800 can be an example implementation of the power improved protocol unit 114.

In certain embodiments, the power improved protocol unit 800 can be part of the first improvement circuitry 206 and/or the second improvement circuitry 216. As an example, the power improved protocol unit 800 may be used by the first improvement circuitry 206 or the second improvement circuitry 216 to improve the power consumption of the communication channel 226. The example power improved protocol unit 800 may include a monitoring circuit interface 802, a power improvement module 806, and a communication channel interface 804.

The monitoring circuit interface 802 may be used for communication with the monitoring circuit 106. As an example, the monitoring circuit interface 802 may be used to receive the modified protocol select signal from the monitoring circuit 106, which can be used to select the power improved protocol for improving the power consumption associated with the communication channel 226.

The power improvement module 806 may be used to improve (e.g., reduce) the power consumption of the communication channel 226 by disabling one or more communication links, which are not being used to carry the communication traffic, without impacting the required bandwidth of the communication channel 226. In certain embodiments, the power improvement module 806 may communicate with the PHY units via the communication channel interface 804 to disable one or more links from the N links, which are not being used to carry the traffic. In some embodiments, the power improvement module 806 may communicate with the PHY units via the communication channel interface 804 to consolidate traffic from two or more physical links into fewer links so that the remaining links can be disabled to reduce power consumption. In some embodiments, the power improvement module 806 may change the frequency or the voltage associated with the PHY units or the links to reduce the power consumption.

The power improvement module 806 may also be used to enable the links, which were previously disabled to reduce power, when the bandwidth requirement increases. In some examples, the power improved protocol unit 800 can be used in parallel with the bandwidth improved protocol unit 400. For example, the bandwidth improved protocol unit 400 may be used to packetize the packets from multiple links or transactions into encapsulated packets to improve the bandwidth of the communication channel 226. In certain embodiments, the bandwidth improved protocol unit 400 may be used to consolidate the traffic from multiple links into encapsulated packets for transmission on fewer links and the remaining links can be disabled by the power improvement module 806 to improve the power consumption.

Figure 9:
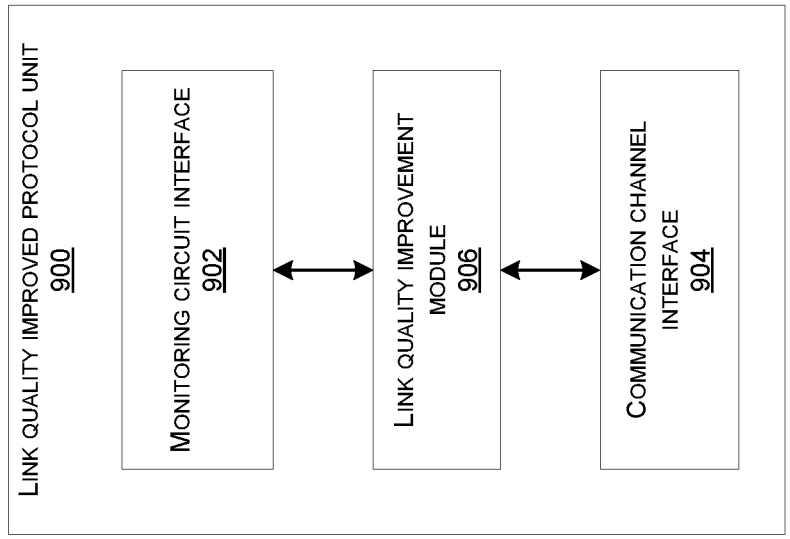
FIG. 9 illustrates a high level block diagram of a link quality improved protocol unit that can be used to improve the link quality associated with a communication channel, according to certain embodiments.

FIG. 9 illustrates a high level block diagram of a link quality improved protocol unit 900 that can be used to improve the link quality associated with a communication channel, according to certain embodiments. The link quality improved protocol unit 900 can be an example implementation of the link quality improved protocol unit 116.

In certain embodiments, the link quality improved protocol unit 900 can be part of the first improvement circuitry 206 and/or the second improvement circuitry 216. As an example, the link quality improved protocol unit 900 may be used by the first improvement circuitry 206 and the second improvement circuitry 216 to improve the link quality of the physical links in the communication channel 226. The example link quality improved protocol unit 900 may include a monitoring circuit interface 902, a link quality improvement module 906, and a communication channel interface 904.

The monitoring circuit interface 902 may be used for communication with the monitoring circuit 106. As an example, the monitoring circuit interface 902 may be used to receive the modified protocol select signal from the monitoring circuit 106, which can be used to select the link quality improved protocol for improving the link quality associated with the communication channel 226.

The link quality improvement module 906 may be used to improve the link quality of one or more links in the communication channel 226 based on certain criteria, e.g., the BER associated with the links. In certain embodiments, the link quality improvement module 906 may compare the BER associated with each link with a threshold value to determine whether the link quality has deteriorated. When the BER is high, the throughput of the communication channel 226 may decrease thus decreasing the performance of the communication channel 226. The link quality improvement module 906 may be used to improve the link quality by transmitting the packets on a different link instead of the links with the inferior quality, or changing the ECC coding to reduce the BER. The link quality improvement module 906 may communicate with the PHY units via the communication channel interface 904 to switch the links for transmission.

In some examples, the link quality improved protocol unit 900 can be used in parallel with the bandwidth improved protocol unit 400, latency improved protocol unit 600, or the power improved protocol unit 800. For example, the link quality improved protocol unit 900 may continuously detect the quality of each link and send the quality information to each of the bandwidth improved protocol unit 400, latency improved protocol unit 600, or the power improved protocol unit 800 so that the links with the inferior quality can be avoided. In some examples, the quality of the links can be improved by re-calibration or other suitable methods.

Figure 10:
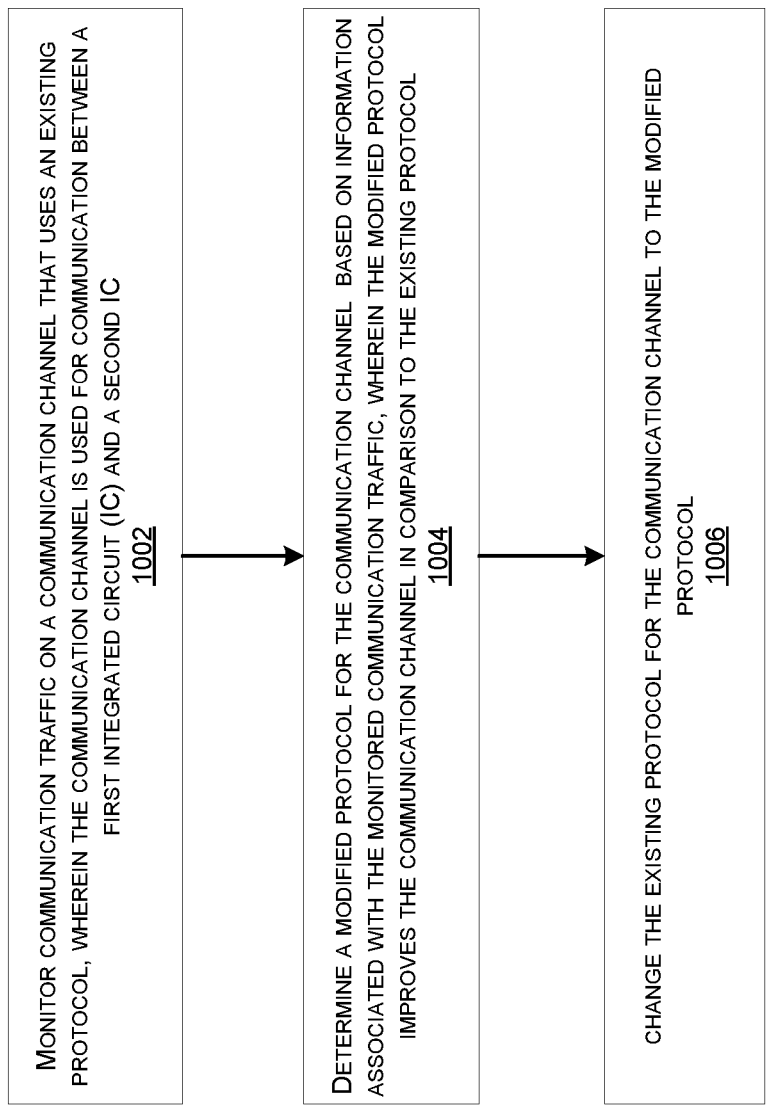
FIG. 10 illustrates a flow chart for a method that can be executed by an integrated circuit to improve a communication channel according to certain embodiments.

FIG. 10 illustrates a flow chart 1000 for a method executed by an integrated circuit to improve a communication channel dynamically according to certain embodiments. For example, the method may be executed by the first improvement circuitry 206 and/or the second improvement circuitry 216 in FIG. 2.

In step 1002, the method may include monitoring communication traffic on the communication channel that uses an existing protocol. The communication channel may be used for communication between a first IC and a second IC. For example, the first monitoring circuit 206a may monitor the communication traffic on the communication channel 226. The communication channel 226 may include N communication links comprising LINK1-LINKn. In certain instances, one or more logical communication links may be mapped to one or more physical communication links.

In step 1004, the method may include determining a modified protocol for the communication channel based on information associated with the monitored communication traffic. The modified protocol can improve the communication channel in comparison to the existing protocol. For example, the information may relate to the latency, bandwidth, power consumption, or the link quality associated with the communication channel for the monitored communication traffic. The first monitoring circuit 206a may determine that the communication channel 226 is not optimized for the monitored communication traffic based on the existing protocol used for the communication between the first die 202 and the second die 204. For example, the measuring unit 302 in the first monitoring circuit 206a may determine the bandwidth, latency, power consumption, or the link quality associated with the current communication traffic based on the existing protocol. The controller 304 may determine whether the bandwidth, latency, power consumption, or the link quality associated with the communication channel is optimized for the monitored communication traffic.

The modified protocol can improve the communication channel in comparison to the existing protocol based on the latency improved protocol, bandwidth improved protocol, link quality improved protocol, or the power improved protocol based upon the determination that the latency, bandwidth, link quality, or the power consumption, respectively, associated with the communication channel for the monitored communication traffic is not optimized based on the existing protocol. The controller 304 may generate control signals that can be used to determine the modified protocol based on the information received from the measuring unit 304, and the information associated with the status of one or more packets or the links received from the first processor 208, first application specific circuitry 210, or the first link parameters monitor 212. Referring back to FIG. 3, the information may be received from the first processor 208 via the processor interface 312, the first application specific circuitry 210 via the application specific circuitry interface 314, or from the first link parameters monitor via the link parameters monitor interface 316. The modified protocol selector 306 in the first monitoring circuit 206a may determine the modified protocol from the latency improved protocol, bandwidth improved protocol, power improved protocol, or the link quality improved protocol.

In step 1006, the method may include changing the existing protocol to the modified protocol. The first protocol modification circuit 206b may be used to change the existing protocol to the modified protocol to improve the communication channel 226 for the monitored communication traffic. For example, the first protocol modification circuit 206b may improve the communication channel 226 using the bandwidth improved protocol unit 400, latency improved protocol unit 600, power improved protocol unit 800, or the link quality improved protocol unit 900 depending on whether the bandwidth, latency, power consumption, or the link quality, respectively, has to be improved for the monitored communication traffic. In certain examples, one or more of the bandwidth, latency, power consumption, or the link quality can be improved for different communication links in parallel based on the configuration of the system.

The controller 304 may communicate with the second die 204 via the communication channel interface 310 regarding the change of the existing protocol to the modified protocol, before the existing protocol is changed. For example, the controller 304 may send a message to the second monitoring circuit 216a indicating the change of the existing protocol to the modified protocol. The second monitoring circuit 216a may send an acknowledgement in response to the message accepting the change. The first protocol modification circuit 206b may change the existing protocol to the modified protocol based upon the communication with the second die 204.

Thus, as discussed with reference to FIGS. 1-10, different embodiments can be used to improve the communication channel between the two ICs based on the information associated with the monitored communication traffic. The improvement circuitry on each IC can monitor the communication channel in real time to determine whether the latency, bandwidth, power consumption, or the link quality associated with the communication channel for the monitored communication traffic is optimized. If the latency, bandwidth, power consumption, or the link quality is not optimized, the improvement circuitry can determine a modified protocol based on the information related to the latency, bandwidth, power consumption, or the link quality, and change the existing protocol to the modified protocol to improve the communication channel. Thus, the improvement circuitry can autonomously improve the communication channel as the communication traffic changes without any intervention from the software or the system.

Figure 11:
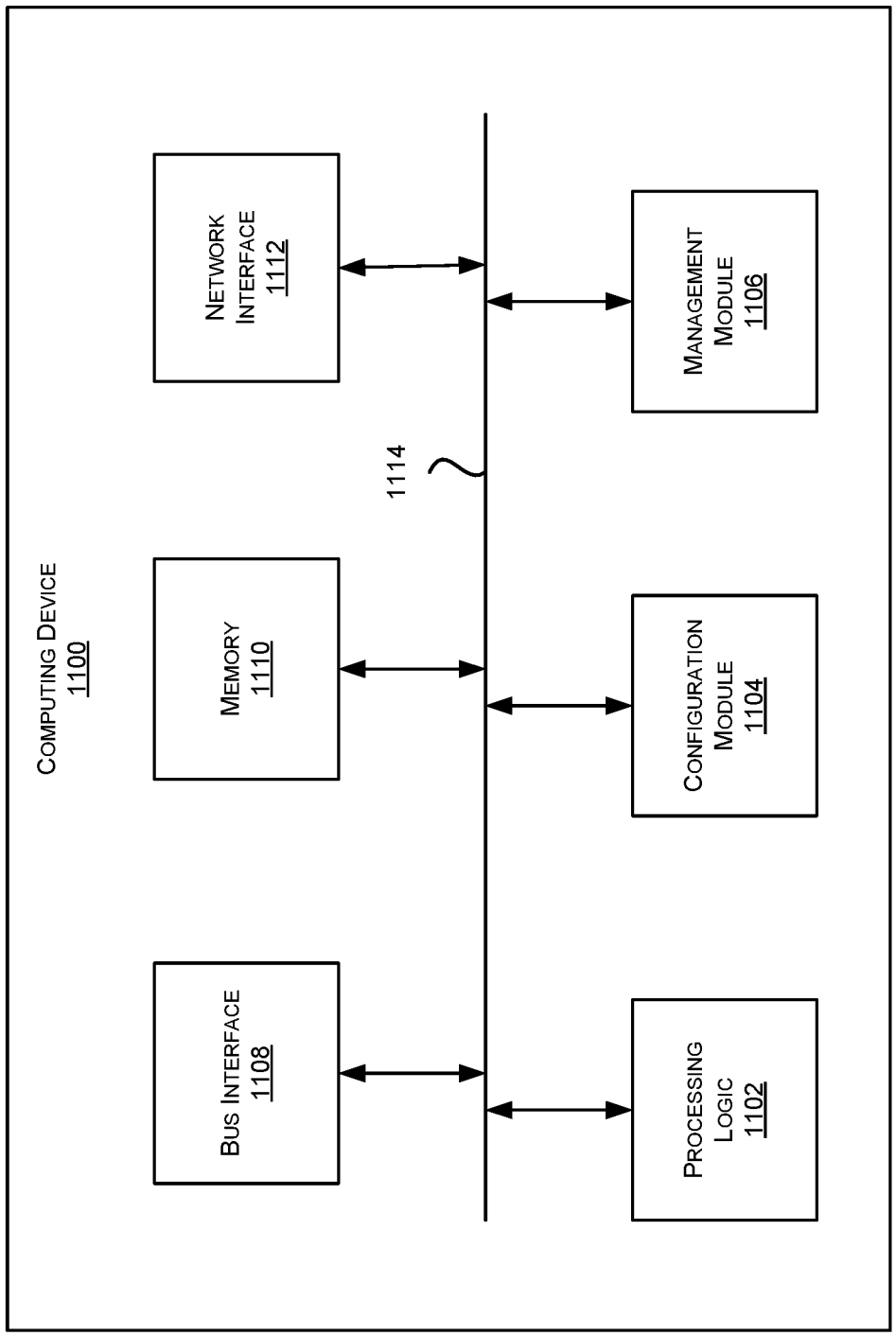
FIG. 11 illustrates an example of a computing device, according to certain aspects of the disclosure.

FIG. 11 illustrates an example of a computing device 1100. Functionality and/or several components of the computing device 1100 may be used without limitation with other embodiments disclosed elsewhere in this disclosure, without limitations. As an example, certain components or functionality of the computing device 1100 can be part of the first die 202 or the second die 204. A computing device 1100 may facilitate processing of packets and/or forwarding of packets from the computing device 1100 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 1100 may be the recipient and/or generator of packets. In some implementations, the computing device 1100 may modify the contents of the packet before forwarding the packet to another device. The computing device 1100 may be a peripheral device coupled to another computer device, a switch, a router or any other suitable device enabled for receiving and forwarding packets.

In one example, the computing device 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The computing device 1100 may include additional modules, which are not illustrated here. In some implementations, the computing device 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Qualcomm®, and the like. In certain implementations, processors may include multiple processing cores, wherein each processing core may be configured to execute instructions independently of the other processing cores.

Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110.

The memory 1110 may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the computing device 1100, while in other cases some or all of the memory may be external to the computing device 1100. The memory 1110 may store an operating system comprising executable instructions that, when executed by the processing logic 1102, provides the execution environment for executing instructions providing networking functionality for the computing device 1100. The memory may also store and maintain several data structures and routing tables for facilitating the functionality of the computing device 1100.

In some implementations, the configuration module 1104 may include one or more configuration registers. Configuration registers may control the operations of the computing device 1100. In some implementations, one or more bits in the configuration register can represent certain capabilities of the computing device 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the computing device 1100.

In some implementations, the management module 1106 may be configured to manage different components of the computing device 1100. In some cases, the management module 1106 may configure one or more bits in one or more configuration registers at power up, to enable or disable certain capabilities of the computing device 1100. In certain implementations, the management module 1106 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the computing device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1100 may include multiple network interface modules, each configured to communicate with a different network. For example, in these implementations, the computing device 1100 may include a network interface module for communicating with a wired Ethernet network, a wireless 802.11 network, a cellular network, an Infiniband network, etc.

The various components and modules of the computing device 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
    a first integrated circuit (IC); and
    a second IC configured to communicate with the first IC via a communication channel based on an existing protocol,
    wherein the first IC comprises:
        a monitoring circuit configured to:
            monitor communication traffic on the communication channel, wherein the communication traffic comprises data packets associated with a hardware or software component in the first IC, the data packets being transmitted using the existing protocol over a plurality of links in the communication channel;
            obtain, from the hardware or software component, information indicating a transmission priority of individual data packets or individual links;
            determine whether latency, bandwidth, power consumption, or link quality associated with the communication channel is optimized with respect to the communication traffic and based on the existing protocol; and
            responsive to determining that the latency, bandwidth, power consumption, or link quality is not optimized based on the existing protocol, select a modified protocol from among a plurality of available protocols, wherein:
                the modified protocol changes a utilization of the plurality of links based on the transmission priority and such that the latency, bandwidth, power consumption, or link quality associated with the communication channel is improved in comparison to the existing protocol;
                the plurality of available protocols comprises a power improved protocol and a bandwidth improved protocol;
                the power improved protocol improves the power consumption by adjusting an operating frequency or voltage of at least one link already being used to transmit the communication traffic; and
                the monitoring circuit is configured to select the power improved protocol, the bandwidth improved protocol, or both the power improved protocol and the bandwidth improved protocol, for use across the plurality of links depending on a required bandwidth of the communication traffic; and
        a protocol modification circuit configured to:
            change the existing protocol for at least some of the links to the modified protocol.

2. The system of claim 1, wherein determining that the link quality associated with the communication channel is not optimized is based on information associated with physical, electrical, or environmental parameters of the communication channel.

3. The system of claim 1, wherein the first IC is on a first die and the second IC is on a second die, and wherein the plurality of links includes serializer/de-serializer (SerDes) links.

4. An apparatus for improving a communication channel between a first integrated circuit (IC) and a second IC, comprising:
    a monitoring circuit configured to:
        monitor communication traffic on the communication channel, wherein the communication traffic comprises data packets associated with a hardware or software component in the first IC, the data packets being transmitted using an existing protocol over a plurality of links in the communication channel;
        obtain, from the hardware or software component, information indicating a transmission priority of individual data packets or individual links; and determine a modified protocol for the communication channel, wherein:
  the monitoring circuit is configured to select from among a plurality of available protocols to determine the modified protocol;
  the modified protocol changes a utilization of the plurality of links based on the transmission priority and such that a latency, bandwidth, power consumption, or link quality associated with the communication channel is improved in comparison to the existing protocol;
  the plurality of available protocols comprises a power improved protocol and a bandwidth improved protocol;
  the power improved protocol improves the power consumption by adjusting an operating frequency or voltage of at least one link already being used to transmit the communication traffic; and
  the monitoring circuit is configured to select the power improved protocol, the bandwidth improved protocol, or both the power improved protocol and the bandwidth improved protocol, for use across the plurality of links depending on a required bandwidth of the communication traffic; and
a protocol modification circuit configured to:
  change the existing protocol for at least some of the links to the modified protocol.

5. The apparatus of claim 4, wherein the monitoring circuit and the protocol modification circuit are part of the first IC, and wherein the monitoring circuit is further configured to:
  communicate with the second IC regarding changing the existing protocol to the modified protocol,
  wherein the protocol modification circuit changes the existing protocol to the modified protocol based upon the communication with the second IC.

6. The apparatus of claim 4, wherein the modified protocol is determined based on information relating to the latency, bandwidth, link quality, or power consumption associated with the communication channel as used to transmit the communication traffic.

7. The apparatus of claim 6 wherein the monitoring circuit is further configured to:
  determine the latency, the bandwidth, the link quality, or the power consumption associated with the communication channel as part of monitoring the communication traffic.

8. The apparatus of claim 7, wherein the monitoring circuit is further configured to:
  determine whether the latency, the bandwidth, the link quality, or the power consumption associated with the communication channel can be improved as a result of changing to the modified protocol while satisfying the transmission priority of individual data packets or individual links,
  wherein the plurality of available protocols further comprises at least one of: a latency improved protocol configured to reduce a latency of the communication channel, or a link quality improved protocol configured to improve a quality of one or more links in the communication channel.

9. The apparatus of claim 8, wherein the plurality of links comprises physical communication links and the communication traffic includes a set of packets corresponding to multiple transactions, and wherein the latency improved protocol improves the latency by transmitting each packet in the set of packets individually on a separate physical communication link.

10. The apparatus of claim 8, wherein:
  the plurality of links comprises physical communication links,
  the communication traffic includes a set of packets corresponding to multiple transactions,
  the set of packets comprises payload data directed for transmission over a set of logical communication links,
  each logical communication link is mapped to one or more of the physical communication links such that the payload data is to be transmitted over multiple physical communication links, and
  the bandwidth improved protocol improves the bandwidth by encapsulating the set of packets into an encapsulated packet for transmitting over a single physical communication link.

11. The apparatus of claim 10, wherein the encapsulated packet includes a header comprising information indicating a number of transactions in the set of transactions, and a size of each transaction.

12. The apparatus of claim 10, wherein each transaction corresponds to a respective logical communication link in the set of logical communication links.

13. The apparatus of claim 10, wherein the second IC is configured to retrieve the set of packets from the encapsulated packet based on the bandwidth improved protocol.

14. The apparatus of claim 8, wherein the plurality of links comprises physical communication links, and wherein the link quality improved protocol improves the link quality by lowering a bit error rate (BER) associated with the physical communication links.

15. A method to improve a communication channel between a first integrated circuit (IC) and a second IC, the method comprising, by the first IC:
  monitoring communication traffic on the communication channel, wherein the communication traffic comprises data packets associated with a hardware or software component in the first IC, the data packets being transmitted using an existing protocol over a plurality of links in the communication channel;
  obtaining, from the hardware or software component, information indicating a transmission priority of individual data packets or individual links;
  determining a modified protocol for the communication channel, wherein:
    determining the modified protocol comprises selecting from among a plurality of available protocols;
    the modified protocol changes a utilization of the plurality of links based on the transmission priority and such that a latency, bandwidth, power consumption, or link quality associated with the communication channel is improved in comparison to the existing protocol;
    the plurality of available protocols comprises a power improved protocol and a bandwidth improved protocol;
    the power improved protocol improves the power consumption by adjusting an operating frequency or voltage of at least one link already being used to transmit the communication traffic; and
    the power improved protocol, the bandwidth improved protocol, or both the power improved protocol and the bandwidth improved protocol, are selected for use across the plurality of links depending on a required bandwidth of the communication traffic; and changing the existing protocol for at least some of the links to the modified protocol.

16. The method of claim 15, wherein the modified protocol is determined based on information relating to the latency, bandwidth, link quality, or power consumption associated with the communication channel as used to transmit the communication traffic, the method further comprising:

determining the latency, the bandwidth, the link quality, and the power consumption associated with the communication channel as part of monitoring the communication traffic.

\* \* \* \* \*